United States Patent [19]
Kunkel et al.

[11] Patent Number: 4,759,921
[45] Date of Patent: Jul. 26, 1988

[54] METHOD OF PREPARING HYDROGEN PEROXIDE

[75] Inventors: Wolfgang Kunkel, Kleinostheim; Gustaaf Goor, Hanau; Jörg Kemnade, Kelkheim-Fischbach, all of Fed. Rep. of Germany

[73] Assignee: Degussa AG, Frankfurt am Main, Fed. Rep. of Germany

[21] Appl. No.: 103,215

[22] Filed: Oct. 1, 1987

[30] Foreign Application Priority Data

Oct. 3, 1986 [DE] Fed. Rep. of Germany ....... 3633672

[51] Int. Cl.$^4$ .............................................. C01B 15/02
[52] U.S. Cl. .................................................. 423/588
[58] Field of Search ...................... 423/589, 588, 590

[56] References Cited

U.S. PATENT DOCUMENTS

| | | | |
|---|---|---|---|
| 2,901,323 | 8/1959 | Sprauer | 423/590 |
| 3,107,151 | 10/1963 | Hauschild | 423/590 |
| 3,996,341 | 12/1976 | Lee | 423/589 |

FOREIGN PATENT DOCUMENTS

| | | | |
|---|---|---|---|
| 534064 | 12/1956 | Canada | 588/ |
| 592287 | 2/1960 | Canada | 423/588 |
| 664876 | 6/1963 | Canada | 423/588 |
| 1109603 | 4/1968 | United Kingdom | 423/589 |
| 1153430 | 5/1969 | United Kingdom | 423/589 |

Primary Examiner—John Doll
Assistant Examiner—Wayne A. Langel
Attorney, Agent, or Firm—Cushman, Darby & Cushman

[57] ABSTRACT

An aqueous hydrogen peroxide extract which contains small amounts of dispersed working solution and a working solution which contains small amounts of dispersed aqueous hydrogen peroxide are collected in the extraction stage of the anthraquinone method for preparing hydrogen peroxide. In order to purify these solutions, the working solution is compounded with aqueous hydrogen peroxide or preferably with water and the hydrogen peroxide extract is compounded with an organic dissolving mixture, preferably a quinone dissolver, and the respective dispersed phase is separated out with the aid of coalescers in a separator unit. It is especially preferable to add 1-3% by volume water or 1-3% quinone dissolver before the coalescer stages and to use coalescers with a drop-enlarging design and filter layers consisting of thermally desized glass filament yarn.

The after-purification in accordance with the method results in a hydrogen peroxide which is improved as regards carbon content and color index as well as in an increase in yield of hydrogen peroxide and in a working solution with constant rel. moisture.

10 Claims, No Drawings

4,759,921

METHOD OF PREPARING HYDROGEN PEROXIDE

The present invention relates to the manufacture of hydrogen peroxide by the so-called anthraquinone method and provides an improved separation.

BACKGROUND OF THE INVENTION

As is known, in the so-called anthraquinone method for the manufacture of hydrogen peroxide (see the summarizing presentation in "Ullmanns Enzyklopaedie der technischen Chemie", 4th revised and expanded edition, vol. 17, pp. 697-704) an anthraquinone derivative, the reaction carrier, is dissolved in a solvent or solvent mixture and the working solution obtained in this manner is hydrogenated in the presence of a catalyst. A part of the anthraquinone derivative is converted by this step into the corresponding anthrahydroquinone derivative. The hydrogenation catalyst is separated by filtration, and the working solution is reacted with oxygen or with an oxygen-containing gas (usually air) to convert the anthrahydroquinone derivative to the anthraquinone derivative with concurrent formation of hydrogen peroxide.

The hydrogen peroxide dissolved in the working solution is extracted with water and the working solution can be recirculated to the hydrogenation stage. Continuous repetition of the individual steps results in a cyclic process in which hydrogen peroxide is synthesized from the gases hydrogen and oxygen.

Regardless of what industrial device is used to extract the hydrogen peroxide, two phases are always obtained after the extraction stage, the working solution phase (raffinate) with reduced $H_2O_2$ content and the aqueous hydrogen peroxide phase (extract).

Each phase contains a very finely dispersed portion of the other phase in small amounts, that is, very fine droplets of a diluted aqueous hydrogen peroxide are contained in the working solution phase and small amounts of working solution droplets are dispersed in the aqueous hydrogen peroxide phase.

Usually, the working solution phase is passed through conventional coagulators and separators, the so-called "water separators" in order to separate out the aqueous dispersed phase. The aqueous phase separated out in the "water separators" is a diluted aqueous hydrogen peroxide solution.

A number of procedures have been suggested in order to purify the aqueous hydrogen peroxide extract. Thus, for example, the purification of the aqueous $H_2O_2$ solutions may be performed by means of an adsorptive treatment. The following adsorbents have been proposed: Activated carbon (U.S. Pat. No. 2,919,975), activated carbon in the form of finely distributed wood charcoal, MgO, freshly precipitated $Al(OH)_3$ or $Mg(OH)_2$ (British Pat. No. 817,556), an activated carbon partially deactivated by means of the adsorption of organic substances which are inert with respect to $H_2O_2$ (DE-PS No. 15 67 814), ethylene polymerizates with a molecular weight over 2000 (GB No. 794,433), water-insoluble, solid, non-polymeric organic substances having molecular weights between approximately 170 and 1000 (DE-PS No. 11 08 191) and porous synthetic resins which are free of chemical functions (DE-OS No. 17 92 177).

Since activated carbon decomposes the hydrogen peroxide to be purified, the treatment is preferably performed at low temperatures. In addition, as the purification proceeds, the adsorbents are charged with the impurities and must be regenerated in a separate circuit with the aid of solvents.

It is also known (U.S. Pat. No. 3,043,666 - FMC) that the aqueous $H_2O_2$ solution can first be treated with a selective solvent for quinones and that the raffinate which is obtained from this step can be heated in the presence of a stabilizer until a coloration occurs. The dissolved organic constituents are oxidized by hydrogen peroxide and are subsequently extracted and finely distilled. These measures are so expensive that they are only justified in the case of special quality products.

In other purification methods the aqueous hydrogen peroxide extract is extracted with a solvent. The solvent used can be an inert liquid hydrocarbon with a boiling point at atmospheric pressure of not above 145° C. (DE. No. 10 36 225) or hydrocarbons with boiling points between 50° and 120° C. and solubilities in water under 0.1% can be used (Japanese Pat. No. 35-2361). Even certain chlorinated hydrocarbons have been suggested (DE-AS No. 11 35 866). Solvent residues have to be stripped from the $H_2O_2$ after the purification in the extractive purification methods which make use of a low-boiling solvent; furthermore, the charged solvent must be regenerated in a separate circuit, which is thus expensive. Finally, many of the solvents suggested have a low flash point.

It should be possible to avoid the disadvantages if the purification stage is performed in a solvent mixture consisting of aromatic substances with a boiling range of 145°-200° C. (British Pat. No. 841,323).

It is also known that a mixture of aromatic hydrocarbons with a boiling point above 145° C. and methylcyclohexylacetate in certain proportions can be used to purify the raw aqueous hydrogen peroxide solutions. (DE-AS No. 14 67 091).

According to the state of the art, the extraction of the impurities is performed in spray columns, sieve-plate columns or in columns filled with filling bodies according to the countercurrent method. Drops of entrained solvent are separated out of the aqueous phase in a succeeding delaying section.

As is known, the mass transfer increases in an extraction process as the phase interface surface increases; however, on the other hand, the separation of a two-phase mixture is facilitated by using larger drops. These two factors which counteract each other limit the yield in an extractive purification of aqueous hydrogen peroxide solutions with solvents in columns.

SUMMARY OF THE INVENTION

The object of the present invention is to separate the dispersed phase from the extracted working solution (raffinate) or from the aqueous hydrogen peroxide extract as completely as possible. Another object is to increase the yield of hydrogen peroxide and lower the color index and the carbon content of the hydrogen peroxide.

It has been found that this object can be achieved if the extracted working solution (raffinate) is compounded and mixed with water or aqueous hydrogen peroxide solution or the aqueous hydrogen peroxide extract is compounded and mixed with a dissolving mixture consisting of an organic solvent which is stable in relation to aqueous hydrogen peroxide and soluble in water to the extent of less than 1%, and the respective dispersed phase is separated out with the aid of coalescers in a separator unit.

Preferably, both phases which accumulate after the initial extraction of the working solution with water, that is, the extracted working solution (raffinate) and the aqueous hydrogen peroxide extract are treated in accordance with the method of the invention.

In addition to water, it is also possible, as mentioned above, to compound and mix aqueous hydrogen peroxide solutions with the extracted working solution (raffinate) prior to separtion with the coalescers in the separator unit. The concentrations of these latter solutions are preferably low. It is especially preferable to compound the extracted working solution (raffinate) with water, to disperse the water, and then to separate the dispersed aqueous phase from the extracted working solution (raffinate) with the aid of coalescers. Water or aqueous hydrogen peroxide solutions are added into the working solution in amounts of 1-5% by volume in relation to the extracted working solution. It is especially preferable to add 1-3% by volume water in relation to the extracted working solution.

All quinone dissolvers known for the anthraquinone method are possible constituents of the dissolving mixture for addition to the hydrogen peroxide extract. The term "quinone dissolver" includes both pure substances known for this purpose as well as their mixtures. Frequently, the quinone dissolver which is selected is one which is already present in the working solution. In general, the dissolving mixture contains 60-100% by volume quinone dissolver and optionally up to 40% by volume, in relation to the dissolving mixture, of other organic solvents which are stable in relation to hydrogen peroxide, are as little soluble in water as possible and which do not disturb the hydrogen peroxide preparation process. This includes, for example, the hydroquinone dissolvers known for the anthraquinone method and especially includes those which are already present in the working solution. It is especially preferable to compound the hydrogen peroxide extract with a dissolving mixture consisting of almost 100% by volume quinone dissolver, which also includes a quinone dissolver consisting of one substance. An aromatic gasoline mixture with a boiling range of 180°-220° C. has proven to be especially well suited as quinone dissolver.

The dissolving mixture is used in amounts of 0.5-5% by volume in relation to the hydrogen peroxide extract. It is preferable to use 1-3% by volume of a quinone dissolver, in relation to the hydrogen peroxide extract.

The aqueous phase and the organic dissolving mixture are added, respectively, to the extracted working solution (raffinate) and to the hydrogen peroxide extract which are produced after the extraction stage and are mixed with them in conventional mixers; an intensive mixing is preferable.

The most advantageous degree of dispersion of the added phase, which depends, among other things, on the design and the filtration fineness of the coalescers used, can be easily determined in preliminary tests.

Subsequently, the separation of the respective dispersed phase is performed with the aid of coalescers mounted in a suitable separator unit. These coalescers are of a conventional design and, like the other parts if the apparatus, they are manufactured from material resistant to hydrogen peroxide. One, two or more coalescers can be used. Two or more coalescers are set up in series in a crosscurrent or countercurrent arrangement.

The phrase "coalescers of a customary design" refers to coalescers such as those described, for example, in "Chemical Engineering Progress" vol. 59, no. 9, pp 87-88, 1963 and in British Pat. No. 1,427,704, the disclosures of which are incorporated herein by reference. It is especially preferable to use coalescers with a design which enlarges drops and which contain one or more filter layers of thermally desized glass fiber filament yarn. The most advantageous charging of the coalescers, that is, the dispersion throughput per time unit and filter element, is best determined by an expert using preliminary tests.

The method of the invention can be performed at temperatures of 10°-70° C.; however, higher or lower temperatures are not excluded. It is preferable to work at 20°-50° C.; the raffinate and the $H_2O_2$ extract can be treated at different temperatures in accordance with the invention.

The invention proceeds contrary to logic by the intentional addition of the phase which it is desired to remove, i.e., by adding aqueous phase to the rafinate or non-aqueous phase to the aqueous extract. Nevertheless, the process considerably increases the degree of washing out the hydrogen peroxide on the one hand from the raffinate and, on the other hand, the impurities, which would result in coloration and undesirably high carbon content of the hydrogen peroxide, from the extract. The yield as well as the color and the carbon content of the hydrogen peroxide are considerably improved by the method of the invention (see Examples 2 and 4).

It is possible, by increasing the dispersed aqueous phase in the raffinate, that is, in the working solution, with subsequent separation of the dispersed phase by the coalescer or coalescers, to increase both the total yield of hydrogen peroxide and also to prevent a rise of the relative moisture in the working solution (see Examples 3 and 4). In particular, the rise of moisture in the raffinate has always been considered to be very disruptive. Such a result, namely maintaining the moisture constant during operation, could not have been foreseen previously.

In this context, the expression "relative moisture" signifies the ratio, expressed in percent, of the moisture content actually present in the constantly recycled working solution to the saturation content of the pure working solution corresponding to the prevailing temperature.

DETAILED DESCRIPTION OF PREFERRED EMBODIMENTS

The invention is illustrated by Examples 1-4. In these examples, the same reaction carrier is used, namely, a mixture of 2-ethylanthraquinone and 2-ethyltetrahydroanthraquinone, and the same working solution is used, including trioctylphosphate as hydroquinone dissolver and an aromatic gasoline with a boiling range of 185°-205° C. as quinone dissolver.

EXAMPLE 1

(Reference example according to the state of the art)

A packed column is operated in a production system for hydrogen peroxide, in accordance with the anthraquinone method for purifying the aqueous hydrogen peroxide, in which column hydrogen peroxide and the quinone dissolver of the working solution are contacted with each other in countercurrent flow. The aqueous hydrogen peroxide phase flows through the column as dispersed phase from the top downward and the quinone dissolver is conducted as continuous phase from the bottom upward.

The efficiency of the purification is determined by the decrease of the carbon content, in mg carbon per liter aqueous $H_2O_2$ raw product, and amounts in a smoothly operating system, on the average, to 30 mg carbon per liter $H_2O_2$ with an initial value of 220 mg carbon per liter aqueous $H_2O_2$ raw product.

Occasional disturbances in the system result in a crude product which appears to be opal to slightly cloudy. It is not possible in this instance to remove the cloudiness by means of this purification stage, that is, a product is obtained after the purification stage which requires a subsequent treatment. In addition, the hydrogen peroxide exhibits a very faint yellowish color due to dissolved chromophores which color has the color value 3 in a standard test for color value. In this test, in order to determine the color value, calibrating solutions of $FeCl_3$ in distilled water are established according to the following scale:

| Color value | mg $FeCl_3$/l |
| --- | --- |
| 0 | 54.0 |
| 1 | 162.6 |
| 2 | 270.4 |
| 3 | 378.6 |

A color comparison is performed in glass tubes between the hydrogen peroxide specimen and these $FeCl_3$ solutions.

EXAMPLE 2

In the operation described in Example 1, a partial current of the aqueous hydrogen peroxide leaving the extraction stage is conducted through a coalescer stage consisting of two coalescer elements connected in series and containing a filter layer of thermally desized glass fiber filament yarn as well as layers for drop enlargement. Two parts by volume of an aromatic gasoline with a boiling range of 182°–214° C. per 100 parts by volume hydrogen peroxide extract are added to the hydrogen peroxide phase flowing from the extraction stage to the coalescers, and the two phases are homogeneously mixed with a speed-regulated pump prior to delivery to the coalescer elements in which they are separated at 20°–25° C.

The efficiency of the stage, expressed once again in mg carbon per liter $H_2O_2$, is 100–120 mg carbon per liter $H_2O_2$ in relation to the same original carbon content as in Example 1. The color value, measured on the $FeCl_3$ scale described in Example 1, drops to 0–1. In the case of occasional disturbances in the extraction stage of the system in which a cloudy product would be expected, a complete purification always occurs in the coalescer stage, that is, the hydrogen peroxide leaving the coalescer stage is always of the same good quality.

EXAMPLE 3, (Reference example)

In the operation described in Example 1, the extracted working solution (raffinate) leaving the extraction stage is conducted, without previous addition of the dispersed phase, through a so-called water separator which is provided with coalescer elements in order to separate out the diluted aqueous hydrogen peroxide phase dispersed in it. Each time the unit is put into operation with new elements, a separation of the dispersed aqueous phase of almost 100% is achieved, that is, the moisture content of the working solution after the water separation state is 100–102% rel. moisture. However, as time progresses, the moisture content in the working solution rises slowly above the initial value, that is, the working solution contains a portion of non-separated, dispersed, aqueous phase. After approximately one year a value of approximately 150–180% rel. moisture is reached and the coalescer elements must be removed and replaced with new elements.

Occasional disturbances in the extraction stage which result in an increased accumulation of dispersed aqueous phase in the working solution briefly cause a rise of the rel. moisture up to 300%, depending on the degree of the disturbance.

EXAMPLE 4

In the operation described in Example 1, approximately 2% by volume water, in reference to the extracted working solution, is added into the extracted working solution (raffinate) before it enters into the coalescer stage and is intensively mixed with the extracted working solution. Over an operating period of 12 months, a rel. moisture of 100% is constantly observed in the working solution leaving the coalescer stage. Processing the separated aqueous phase, which contains a slight amount of hydrogen peroxide, causes the $H_2O_2$ yield to rise by 0.2–0.3%. Even in the case of occasional disturbances in the extraction stage, a rel. moisture of 100% is always found in the working solution after the coalescer stage. This excellent performance of the separator stage was also observed after more than 18 months of operation.

What is claimed is:

1. In a method of preparing hydrogen peroxide according to the so-called anthraquinone method, in which the hydrogen peroxide dissolved in the working solution is extracted in the extraction stage with water to produce an extracted working solution with reduced hydrogen peroxide content as well as an aqueous hydrogen peroxide extract, and in which small amounts of diluted aqueous hydrogen peroxide solution remain dispersed in said extracted working solution and small amounts of working solution remains dispersed in said hydrogen peroxide extract which necessitate further purification;

the improvement in which said extracted working solution is compounded and mixed with water or an aqueous hydrogen peroxide solution or said aqueous hydrogen peroxide extract is compounded and mixed with a dissolving mixture consisting essentially of an organic solvent which is stable in relation to aqueous hydrogen peroxide and soluble in water to an extent of less than 1% by volume, and the dispersed phase is separated out from the resulting mixture with the aid of coalescers in a separator unit.

2. A method according to claim 1 in which both the extracted working solution and the aqueous hydrogen peroxide extract are treated.

3. A method according to claim 1 or claim 2 in which water or an aqueous hydrogen peroxide solution is added to the extracted working solution in an amount of 1–5% by volume in relation to the working solution.

4. A method according to claim 1 or claim 2 in which said dissolving mixture is added to the aqueous hydrogen peroxide extract in an amount of 0.5-5% by volume, in relation to said hydrogen peroxide extract.

5. A method as set forth in claim 1 or claim 2 in which the dissolving mixture consists essentially of 100% by volume quinone dissolver.

6. A method according to claim 1 or claim 2 in which 1-3% by volume water is added to the extracted working solution in relation to the volume of the extracted working solution.

7. A method according to claim 1 or claim 2 in which 1-3% by volume quinone dissolver is added to the aqueous hydrogen peroxide extract, in relation to the volume of the hydrogen peroxide extract.

8. A method according to claim 1 or claim 2 in which the dissolving mixture contains an aromatic gasoline mixture having a boiling range of 180°-220° C.

9. A method according to claim 1 or claim 2 in which coalescers with a drop-enlarging design are used which contain one or more filter layers of thermally desized glass fiber filament yarn.

10. A method according to claim 1 or claim 2 in which two coalescers connected in series are used.

* * * * *